Jan. 9, 1934. R. W. LYTLE 1,943,024
SILENT GEAR AND METHOD OF MANUFACTURE
Filed Oct. 20, 1932 2 Sheets-Sheet 1
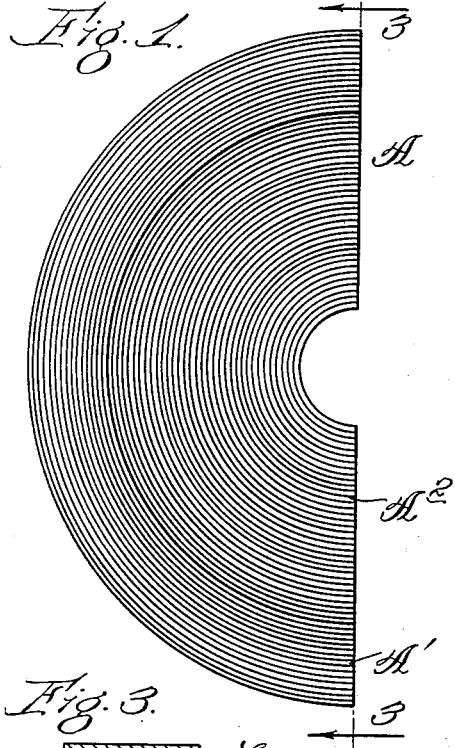
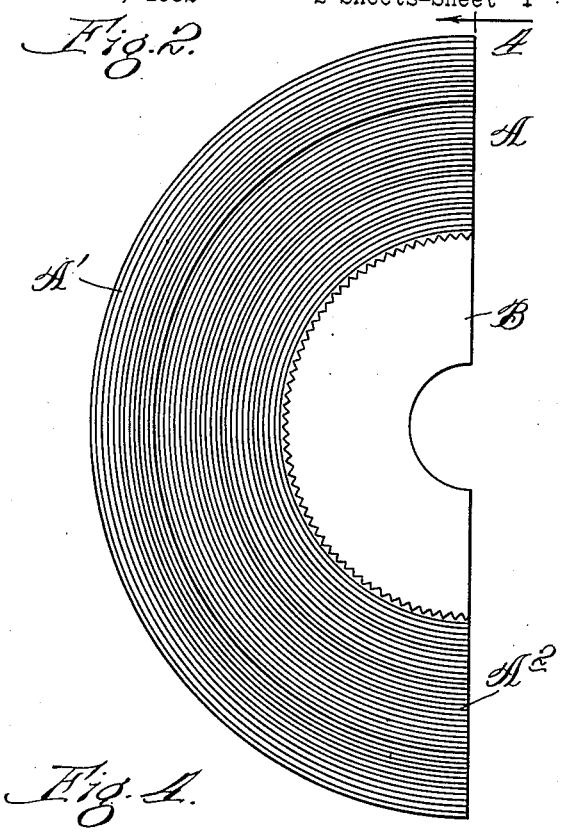
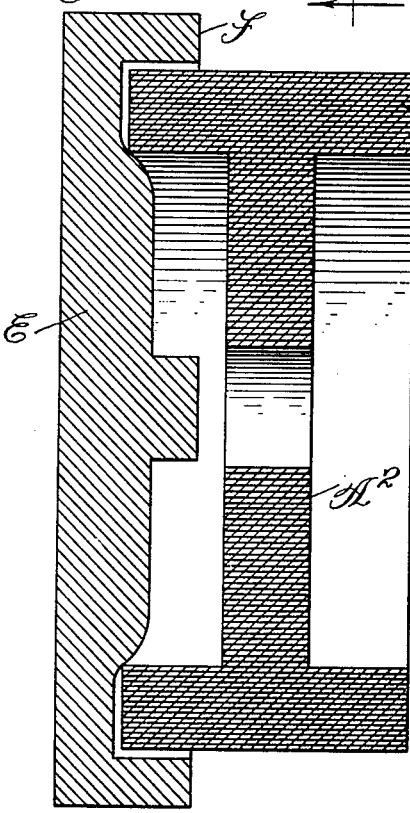
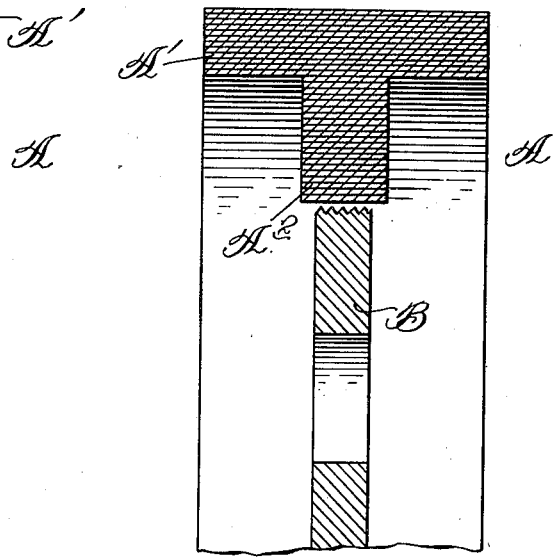
Inventor:
Robert W. Lytle.
By Dyrenforth, Lee, Chritton & Wiles
Attys.

Jan. 9, 1934. R. W. LYTLE 1,943,024
SILENT GEAR AND METHOD OF MANUFACTURE
Filed Oct. 20, 1932 2 Sheets-Sheet 2
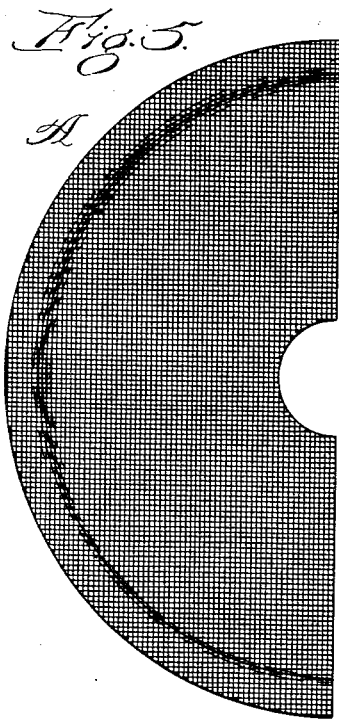
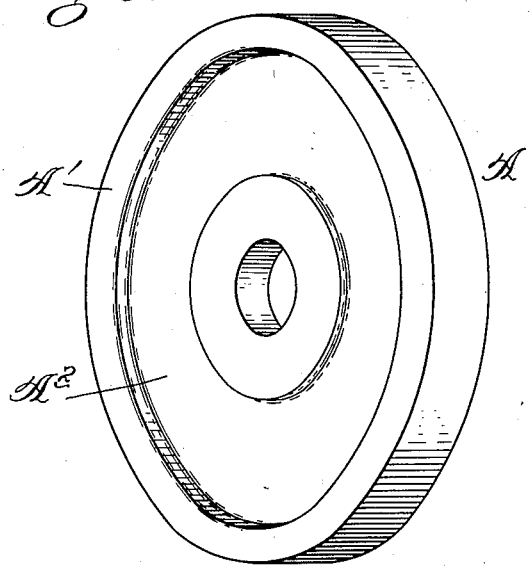
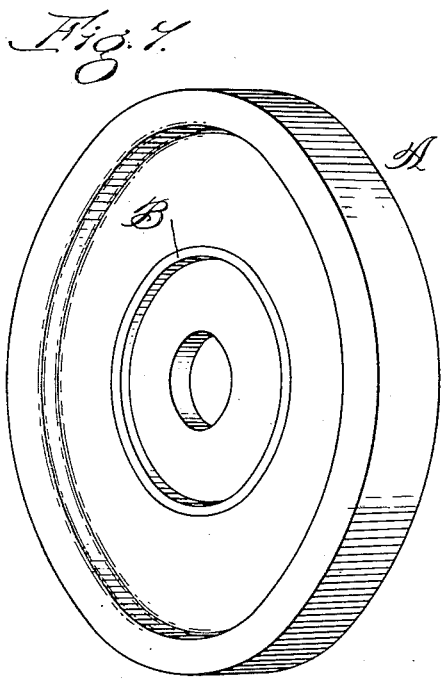
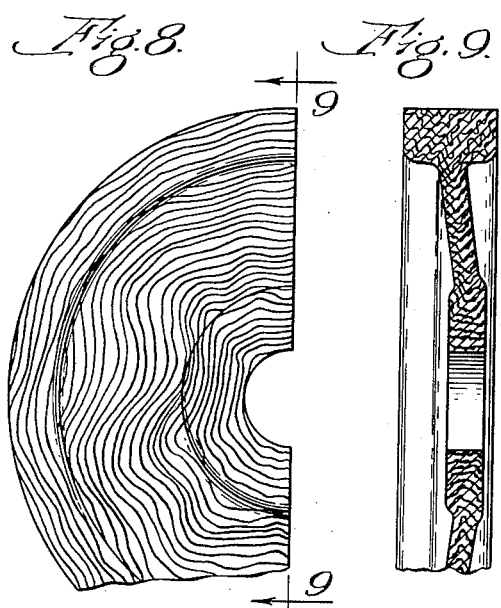
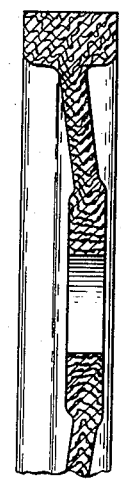
Inventor:
Robert W. Lytle.
By Dyrenforth, Lee, Chritton & Files
Attys.

Patented Jan. 9, 1934

1,943,024

UNITED STATES PATENT OFFICE 1,943,024

SILENT GEAR AND METHOD OF MANUFACTURE

Robert W. Lytle, Cincinnati, Ohio, assignor to The Formica Insulation Company, a corporation of Ohio Application October 20, 1932. Serial No. 638,795

4 Claims. (Cl. 154—2)

This invention relates particularly to an improved wheel or gear blank of the silent gear type and a method of forming the same.

Such gears are commonly made from a fibrous product impregnated with a varnish such as a bakelite varnish, the mass being compacted and hardened under heat and pressure.

The primary object of the present invention is to provide a more economical method of producing such blanks. As commonly produced, the wheels are formed from layers of circular disks, or from comminuted material and as a result there is either a large amount of scrap loss where the disks are used, or a wheel of non-uniform density where comminuted material is weighed out into a mold.

In my Patent No. 1,912,083, granted May 30, 1933, I have described a method whereby the web portion of the wheel may be produced by winding concentrically, strips of fabric, coupled with a rim portion having its laminations in a vertical plane.

In the present invention the hub portion, web and rim portions or the rim portion alone are all made from spirally wound strips of fabric. By adjusting the width of the strips, it is possible to make a wheel from such an assembly with no scrap loss, and of great strength, as well as uniform density.

The invention is illustrated in a preferred embodiment in the accompanying drawings, in which:

Fig. 1 represents a broken plan view of an unmolded assembly; Fig. 2 is a broken plan view of a similar assembly, having a metallic hub portion; Fig. 3 represents a sectional view taken along the line 3—3 in Fig. 1; Fig. 4 is a sectional view taken along the line 4—4 in Fig. 2; Fig. 5 represents an assembly like that shown in Fig. 1, fitted with cover devices; Fig. 6 represents a perspective view of a molded wheel produced from an assembly like that shown in Fig. 1; Fig. 7 represents a corresponding view of a molded wheel from the assembly shown in Fig. 2; Fig. 8 shows a broken side view of a complete uncovered wheel, and Fig. 9 shows a cross section along line 9—9 in Fig. 8.

In the form shown in Fig. 1, A designates an assembly built up of spirally wound layers of fabrics $A^1$ and $A^2$. These fabrics may be of different width, as shown in Fig. 3, to provide for the varying thickness of the web and rim of the wheel as shown in Fig. 6. The fabric is preferably of fibrous material impregnated with a binder adapted to harden under heat and pressure, as, for example, a phenolic condensation product such as bakelite or a urea-formaldehyde condensation product. In producing the assembly, the fabric is preferably wound upon a mandrel having a diameter somewhat larger than desired for the inner diameter of the molded wheel. The fabric is preferably wound upon the mandrel until its outer diameter is slightly less than that desired for the molded wheel. In general, for a wheel of, say, six inches outer diameter and two inches inner diameter, the respective diameters of the assembly are preferably about 5⅞ and 1¹³⁄₁₆. The difference in volume and weight is made up by properly adjusting the width of the fabric, which in all cases is greater than that desired for the wheel. In practice, the relative dimensions are preferably so adjusted that the weight of the assembly is equivalent to that of the molded wheel, the assembly being just enough heavier to allow for the loss by evaporation on molding. In Fig. 3, the assembly A is shown in conjunction with one-half of a mold or die E.

After the assembling operation, the assembly may be placed in a mold and consolidated under heat and pressure. In this operation, which may be performed at a temperature of about 175° C. under a pressure of about 2,000 pounds per square inch, in accordance with known practice, the resin is converted to an infusible substantially insoluble condition. A view of the assembly in one face of the mold is shown in Fig. 3.

After the product is removed from the mold, it is preferably introduced into a heated bath of oil and subjected to prolonged heat treatment at relatively moderate temperature. The treatment may be for a number of hours, at a temperature of about 60° C., and thereafter at a higher temperature, say, up to about 100° C. Usually, it is desirable to perform this heat treatment for a period of 30–60 hours.

In the hot-pressing operation, the pressure of the dies may be relieved one or more times to permit escape of gases; and in the subsequent heat treatment in an oil bath, gases are permitted to escape from the laminated product, a further slow condensing of the resin taking place during this period. The molded wheels are represented in Figs. 6 and 7.

During the molding operation, the assembly is pressed into a wheel of a proper size, the laminations $A^1$ and $A^2$ being enormously compressed and greatly modified in the process. The finished wheel may be one-half or less of the width of the assembly due to such compression.

The laminations are in general bent away from the edges into directions at substantial angles and in many instances almost vertical to the axis as shown in Fig. 9, but they are also pressed into circumferential undulations as shown in Fig. 8. The combined result is to provide a serpentine effect, as shown on the exterior of the wheel in Fig. 8. This result is furthered by the slight gas between the assembly and the mold. Structurally this bending and folding of the fabric produces a wheel of remarkable strength and one which is equally resistant to stresses or strains from all directions.

The combined lateral folding and compression, and the circumferential buckling or undulations, results in a wheel which is interfolded in all directions, and presents such interfolded laminations to a stress, strain, or shearing force applied from any direction. This gives a wheel or blank of remarkable strength.

In the modification shown in Fig. 2, a metallic hub-portion B, preferably of metal, is provided. In assembling this modification, the fabric may be wound directly upon the metal hub-portion, or it may be wound as usual and the hub portion slipped in.

A further modification is illustrated in Fig. 5, where C and C' represent fabric cover pieces which may be applied to one or more sides of the assembly in order to give it additional surface strength and an improved appearance. The cover may or may not be the same as that used in the body of the assembly.

By the use of this invention there is a considerable saving of labor and material cost, since there is none of the scrap loss incident to cutting circular disks, and the assembly may be made with great ease and rapidity. By making the assembly with the dimensions shown, it slips into the mold with no difficulty. By the use of such an assembly, the irregular density so common where the material is inadequately distributed in comminuted form is likewise avoided.

Likewise, the rim portion of the blank may be prepared in the manner described, but the web portion prepared in other manners, for example by the use of shredded impregnated fabric, or fabric wound in the usual manner with its laminations vertical to the axis of the blank.

By reference to Figs. 6 and 7, it will be understood that the gear-blank, after the consolidating operation, has its rim provided with a smooth circumferential surface so that the rim is suitable for the milling of teeth therein for silent gear purposes. As roughly shown in Fig. 9, the laminations of the web and the laminations of the rim are, in the pressing operation, provided with wrinkles which extend in a circumferential direction and intermesh. In practice, they are, of course, closely compacted together in their intermeshed relation. These wrinkles which extend in a circumferential direction are produced by lateral folding, or wrinkling, of the laminations, as explained above. The effect of the process, as has been indicated, is to produce a gear-blank structure which is especially well adapted to resist stresses exerted in any direction.

The foregoing detailed description has been given for clearness of understanding only, and no unnecessary limitations should be understood therefrom, but the appended claims should be construed as broadly as permissible, in view of the prior art.

I claim:

1. The method of forming a gear-blank which comprises: forming an assembly comprising a web-portion comprising a spirally wound relatively narrow fabric-strip impregnated with a heat-hardening binder and an encircling rim-portion comprising a spirally wound relatively wide fabric-strip impregnated with a heat-hardening binder; and consolidating and hardening the assembly under heat and under pressure which is applied against the edges of the laminations and produces intermeshing wrinkles in the laminations which extend in a circumferential direction.

2. The process set forth in claim 1, as practiced by performing the consolidating operation in dies of substantially greater diameter than that of the assembly.

3. A gear-blank having a smooth cylindrical outer circumference suitable for the milling of gear-teeth therein; said gear-blank comprising a relatively narrow spirally-wound binder-impregnated fabic-strip forming a web and an encircling relatively wide spirally-wound binder-impregnated fabric-strip forming a rim-portion, the binder comprsing a heat-hardening synthetic resin, the gear-blank having been consolidated and hardened under heat and pressure and having in its laminations wrinkles which extend in a circumferential direction and are intermeshed.

4. A gear-blank having a smooth cylindrical outer circumference suitable for the milling of gear-teeth therein, said gear-blank comprising a metal hub portion, an encircling relatively narrow spirally-wound binder-impregnated fabric-strip forming a web and an encircling relatively wide spirally-wound binder-impregnated fabric-strip forming a rim-portion, the binder comprising a heat-hardened synthetic resin, the gear-blank having been consolidated and hardened under heat and pressure and having in its laminations wrinkles which extend in a circumferential direction and are intermeshed.

ROBERT W. LYTLE.